US008682144B1

(12) United States Patent
Zhang et al.

(10) Patent No.: US 8,682,144 B1
(45) Date of Patent: Mar. 25, 2014

(54) METHOD FOR SYNCHRONIZING MULTIPLE AUDIO SIGNALS

(71) Applicants: Jiangyang Zhang, Los Angeles, CA (US); Anil Kokaram, Sunnyvale, CA (US); Debargha Mukherjee, Sunnyvale, CA (US); Andrew Joseph Crawford, San Francisco, CA (US); Damien Kelly, Sunnyvale, CA (US)

(72) Inventors: Jiangyang Zhang, Los Angeles, CA (US); Anil Kokaram, Sunnyvale, CA (US); Debargha Mukherjee, Sunnyvale, CA (US); Andrew Joseph Crawford, San Francisco, CA (US); Damien Kelly, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/621,604

(22) Filed: Sep. 17, 2012

(51) Int. Cl.
*G11B 27/00* (2006.01)
*H04N 5/93* (2006.01)
*H04N 5/931* (2006.01)
*H04N 5/932* (2006.01)
*H04N 5/935* (2006.01)

(52) U.S. Cl.
USPC ........... 386/278; 386/201; 386/202; 386/207; 386/280; 386/285

(58) Field of Classification Search
USPC .................. 386/201, 202, 207, 278, 280, 285
See application file for complete search history.

(56) References Cited

U.S. PATENT DOCUMENTS

| 8,205,148 | B1 | 6/2012 | Sharpe et al. | |
| 2012/0194737 | A1* | 8/2012 | Cafarella et al. | 348/512 |
| 2012/0198317 | A1* | 8/2012 | Eppolito et al. | 715/202 |
| 2013/0121668 | A1 | 5/2013 | Meaney et al. | |
| 2013/0124206 | A1* | 5/2013 | Rezvani et al. | 704/270 |
| 2013/0188923 | A1 | 7/2013 | Hartley et al. | |

FOREIGN PATENT DOCUMENTS

EP 0618728 A2 10/1994

OTHER PUBLICATIONS

C. Knapp et al., "The Generalized Correlation Method for Estimation of Time Delay", IEEE Transactions on Acoustics, Speech and Signal Processing, vol. 24, Issue 4, pp. 320-327, 1976.
C. Lu et al., "An Efficient Technique for Motion-Based View-Variant Video Sequences Synchronization", in Proc. ICME, pp. 1-6, 2011.
C. Rao et al., "View-invariant alignment and matching of video sequences", in Proc. ICCV, IEEE 2003, pp. 1-7.
E. Dexter et al., "Multi-view Synchronization of Human Actions and Dynamic Scenes", in Proc. BMVC, pp. 1-11, 2009.

(Continued)

*Primary Examiner* — Daquan Zhao
(74) *Attorney, Agent, or Firm* — Birch, Stewart, Kolasch & Birch, LLP

(57) ABSTRACT

Provided are methods for synchronizing multiple video recordings of the same event using audio signals of the recordings. An algorithm is designed to generate candidate time offsets for pairwise matches of video recordings based on audio signals corresponding to the recordings, and combine the candidate time offsets to obtain the most accurate actual time offset between each pair of recordings. Each candidate time offset for each pairwise match of recordings is assigned a confidence measure indicating how likely it is that the particular time offset is correct for the given pair of recordings. The confidence measure assigned to a particular time offset is based on various components and characteristics of the audio signal pair corresponding to the video recordings.

20 Claims, 12 Drawing Sheets

(56) References Cited

OTHER PUBLICATIONS

N. Hasler et al, "Markerless Motion Capture with Unsychronized Moving Cameras" in Computer Vision and Pattern Recognition (CVPR), IEEE 2009, pp. 224-231.

P. Shrestha et al., "Synchronization of Multiple Camera Videos Using Audio-Visual Features", IEEE Transactions on Multimedia, vol. 12, No. 1, pp. 79-92, Jan. 1, 2010.

S. Tasaka et al., "Real-Time Estimation of User-Level QoS of Audio-Video Transmission over IP Networks", ICC, pp. 884-890, Jun. 11, 2006.

* cited by examiner

METHOD FOR SYNCHRONIZING MULTIPLE AUDIO SIGNALS

TECHNICAL FIELD

The present disclosure generally relates to a method for synchronizing signals. More specifically, aspects of the present disclosure relate to synchronizing multiple video recordings using audio features of the recordings.

BACKGROUND

Since just before the start of the twenty-first century, the rate of creation of audio and video content by the average consumer has increased beyond the availability of systems to organize such content. With the exponential rise in the number and quality of personal media recording devices (e.g., smartphones), it has become commonplace for people to record audio and video at various social events, such as concerts, sporting events, etc. However it remains difficult for people to share their recordings in a simple way. Social media sites provide a venue for users to upload their recordings and point others to view their recordings, but in the case of shared events this functionality is almost by accident and not by design.

One key technology is the ability for the gathering system to work out how each recording can be related to one another in time. This is because users typically record only short snippets of an event, and the notion of "hardware" synchronization between mobile devices does not exist. Also, many mobile devices do not incorporate a time measure into their video streams. For a large-scale event attended by many users, such as a concert, the users' devices may collectively have a complete recording of the event not only across the duration of the event but also quite possibly from different points of view. However, without reference to a universal "clock" (or the equivalent thereof), it is not possible to view the recorded data in this manner (e.g., as a recording of the complete event).

In the context of "social" videos (e.g., video clips of live concerts, sporting events, etc. captured by users and shared via social networks), achieving a robust design for video synchronization involves overcoming several challenges posed by the inherent characteristics of such social videos. For example, social videos tend to have poor sound quality and low camera resolution, there is often local noise due to the environment in which the video is being captured, and extreme camera shake is a regular problem.

Creating a reference to a universal clock would also allow each user to see not only the recordings of other users, but also to see what someone else was seeing or hearing at the same time that they were recording the event. In essence, a technology that could work out, using the media signal only, what the time offset was between the various recordings, would be able to align all of the recordings on a single reference timeline. From that point on, automatic or manual editing becomes feasible.

The notion of using multiple cameras to record an event has long been used in the cinema industry. It is common in that industry to have a "hero" or main camera following a scene accompanied by lesser "witness" cameras which capture the scene from different points of view. Since 2005, it has become commonplace to use the witness views to help to capture 3-Dimensional information about the scene. This allows for more creativity in post-production. On set, many professional cameras are "genlocked" by hardware signals that ensure each frame is being recorded at the same time from each camera, and that timestamp is known and recorded alongside the pictures. In semi-professional scenarios, "genlocked" cameras are expensive and not used very often, and therefore recent approaches have started to explore how it is possible to work out the offset in time between the various signals even if they were not "genlocked".

The sound of a "clapper board" clacking is sometimes used by editors to align multiple camera views. Some approaches have considered placing sound sources in the scene and using that to synchronize the views by comparing the audio signals between recordings. Others have considered using the speech of the actors in the scene itself. Given that hundreds or even thousands of recordings of a single event (e.g., a sporting event, concert, public rally, etc.) are uploaded by users, having the ability to automatically work out the time shift between all of the recordings would allow for the alignment of the recordings with each other.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

One embodiment of the present disclosure relates to a method for synchronizing audio signals, the method comprising: matching pairs of audio signals to estimate candidate time offsets between corresponding pairs of video recordings; assigning a confidence measure to each of the candidate time offsets of each pair of video recordings based on features of the corresponding pair of audio signals; and combining the candidate time offsets of all the pairs of audio signals to estimate final time offsets for each of the corresponding video recordings relative to any reference timeline.

In another embodiment, the step of combining the candidate time offsets of all of all the pairs of audio signals includes: creating probability distributions based on the candidate time offsets; and estimating each final time offset using an iterative technique based on a graphical representation of the pairs of video recordings, wherein the iterative technique combines the probability distributions into a final probability distribution over all candidate time offsets.

Another embodiment of the disclosure relates to a method for synchronizing a plurality of video recordings, the method comprising: generating candidate time offsets between at least one pair of video recordings; assigning a confidence measure to each of the candidate time offsets based on audio signals of the at least one pair of video recordings; and combining the candidate time offsets and the assigned confidence measures to estimate a final time offset between the at least one pair of video recordings.

In other embodiments of the disclosure, the methods described herein may optionally include one or more of the following additional features: matching the pairs of audio signals includes generating a correlation function between signal pairs in the time-domain; matching the pairs of audio signals includes generating a correlation function using phase correlation between the signal pairs; matching the pairs of audio signals includes generating a correlation function based on spectrograms of each signal; assigning the confidence measure to each of the candidate time offsets of each pair of video recordings includes assigning a confidence measure to a select group of matches between any single pair; and/or the confidence measure is generated by combining measurements of slope, absolute height, relative height, and variance of peaks of the select group.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the invention will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
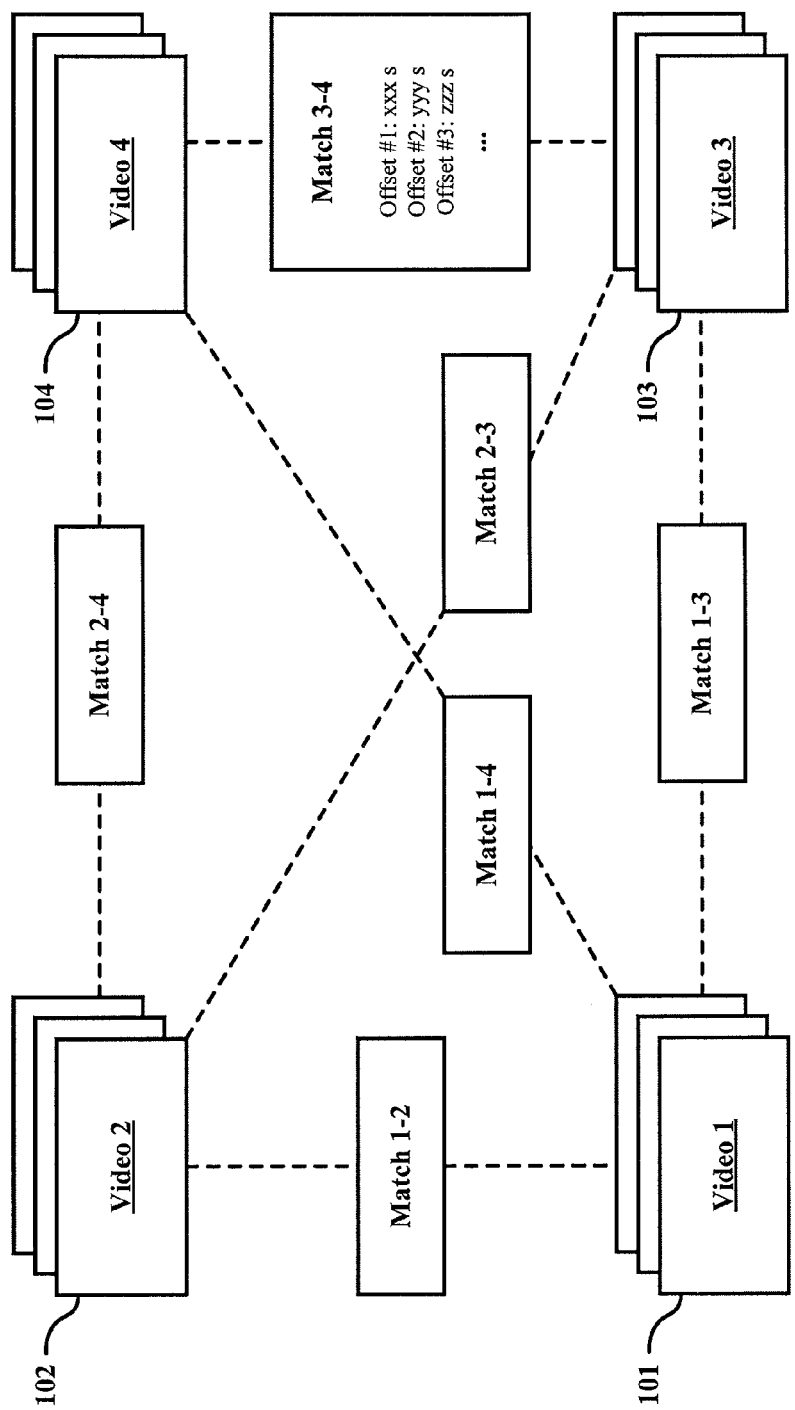
FIG. 1 is a block diagram illustrating an example multi-sequence synchronization problem for which one or more embodiments described herein may be implemented.

The headings provided herein are for convenience only and do not necessarily affect the scope or meaning of the claimed invention.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

Embodiments of the present disclosure relate to methods for synchronizing multiple video sequences of the same event. In particular, the present disclosure describes a design for an algorithm that takes possible time offsets for pairwise matches of audio signals of video recordings (e.g., video clips or sequences) of the same event and combines them to obtain the most accurate time offset between each pair of recordings. As will be further described herein, each possible (e.g., candidate) time offset for each pairwise match is assigned a confidence measure according to how confident the system is that the particular time offset is correct for the pair of recordings.

It should be noted that the present disclosure describes methods and techniques for combining possible matches amongst many pairs of signals, including audio signals, video signals, or a mixture of both. The combination algorithm presented herein operates on probability distributions, and therefore the source of the signals involved in the algorithm is of little consequence. Accordingly, while many embodiments and examples are described in the context of a particular signal type, it should be understood that the particular signal type is for illustrative purposes only, and is in no way intended to limit to scope of the present disclosure.

1. Multi-Sequence Synchronization: Overview of Method

FIG. 1 illustrates an example of a multi-sequence synchronization problem addressed by the methods presented herein. The multi-sequence synchronization problem shown in FIG. 1 includes four video recordings (which may also be referred to as "video sequences", "video clips", and the like) 101-104, and provides a context for the following description of various embodiments and features of the methods for synchronizing multiple signals.

A naive approach to synchronizing multiple video sequences would take the best-matching pairs of video recordings 101-104 and reject the remaining recordings as being not informative. But consider, for example, the scenario where a user who recorded video recording 101 was, at the time of recording, located far away from the users who recorded video recordings 102 and 103, but close to the user who recorded video recording 104. Additionally, the user who recorded video recording 104 was located close to the users who recorded video recordings 102 and 103. In such a scenario, the correlation between video recordings 101 and 104 would likely be poor because being far apart they would not necessarily share the same audio environment. Hence the local sound around 101 may be different from that around 104 and so the correlation between them may be too low to yield an effective offset measurement in this pair. However, in accordance with the synchronization method described herein, the time offset between video recordings 101 and 104 can be inferred using the relative offsets between, for example, video recordings 101 and 102, and video recordings 102 and 104. In those cases the recordings would have shared similar audio environments (being closer to each other) and so the correlation between them would be better able to yield useful time offset information.

As will be described in greater detail below, the present disclosure provides a method for taking all of the pairwise matches between video recordings of the same event and formally combining them to get the most accurate time offset between each pair of signals. The following sections present the synchronization method in three stages: pairwise matching, confidence estimation, and combining the information. However, it should be understood that while the method is presented as comprising three stages, this is simply for the sake of clarity, and is not intended to limit the scope of the disclosure in any way.

Additionally, in the following sections reference is made to the flowchart of the process illustrated in FIG. 3.

1.1. Pairwise Matching

The process begins at step 300 where an audio signal of each recording is matched with every other recording. For example, with reference to FIG. 1, an audio signal of each of video recordings 101-104 is matched with one another to form pairs of audio recordings. For example, a signal of "video 1" 101 is matched with a signal of "video 2" 102, a signal of "video 3" 103, and a signal of "video 4" 104 (represented in FIG. 1 as "Match 1-2", "Match 1-3", and "Match 1-4", respectively); a signal of "video 2" 102 is matched with a signal of "video 3" 103 and a signal of "video 4" 104 (represented in FIG. 1 as "Match 2-3" and "Match 2-4", respectively); and a signal of "video 3" 103 is matched with a signal of "video 4" 104 (represented in FIG. 1 as "Match 3-4").

Any of a variety of methods known to those skilled in the art may be used for matching two audio signals in step 300. One example method is to simply measure the entire correlation function between the audio signals of two recordings (e.g., between the audio signals of video recording 101 and video recording 102, as shown in FIG. 1), and the peak of that correlation function will correspond to the time offset between the two signals. Another example method is Phase Correlation, which is used in multi-channel audio signal processing for the purpose of matching audio signal pairs.

Figure 3:
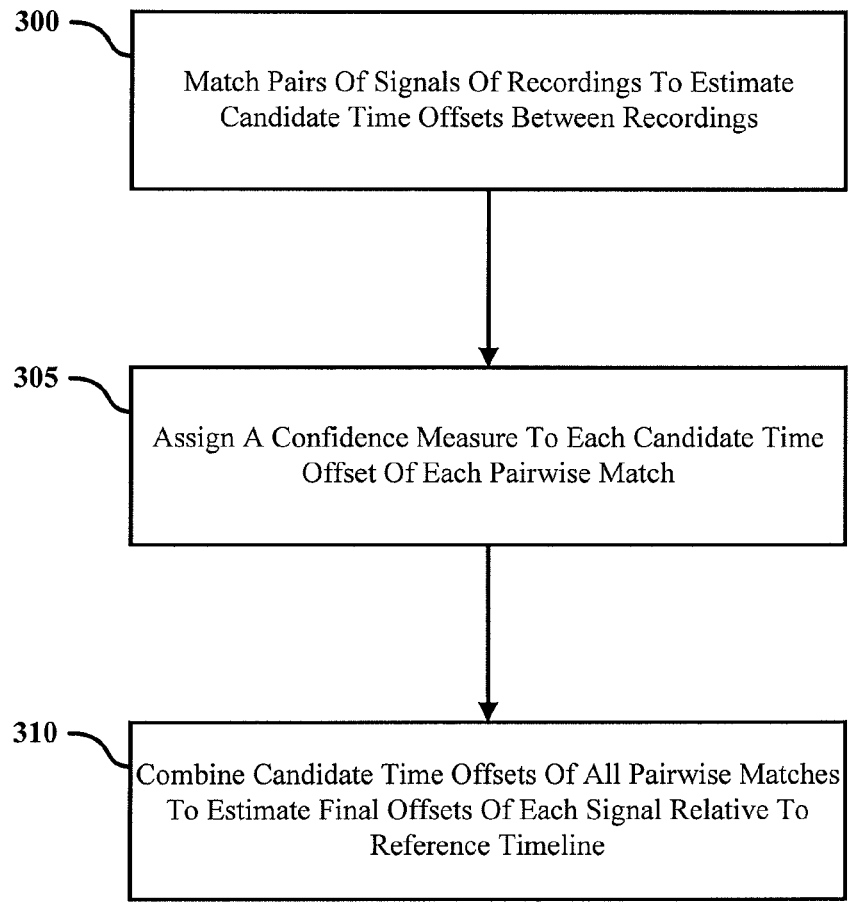
FIG. 3 is a flowchart illustrating an example method for synchronizing multiple recordings of the same event according to one or more embodiments described herein.
Figure 4:
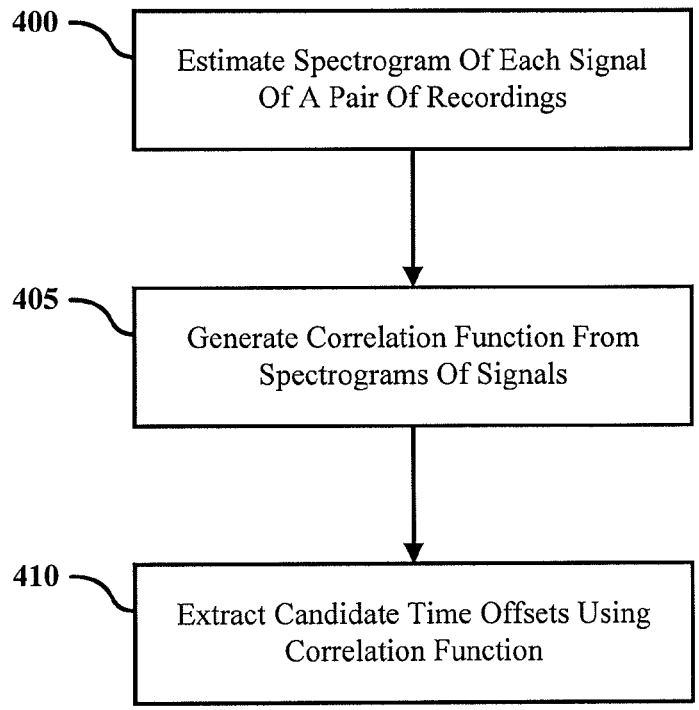
FIG. 4 is a flowchart illustrating an example method for matching audio signals according to one or more embodiments described herein.

FIG. 4 illustrates an example method used for matching audio signals (e.g., in step 300 of the process shown in FIG. 3) according to at least one embodiment of the present disclosure. In step 400, the matching process begins by estimating the spectrogram of each of the two time-domain audio signals. The process then moves to step 405, where the correlation between the 2-d spectrograms of each signal is measured. For example, at least one arrangement uses 20 millisecond (ms) analysis windows along with the Hanning window function to prevent spectral leakage. In step 405, a correlation function for the two signals is generated by taking each 20 ms interval of the spectrogram of one signal and correlating it with the 20 ms intervals of the spectrogram of the other signal, with a 5 ms granularity. In step 410, the correlation function generated in step 405 is examined to extract N time offsets (where "N" is an arbitrary number) corresponding to the top N correlation peaks. In at least one implementation, N=5. As will be further described below, these N time offsets represent possible time offsets between the pair of matched audio signals.

1.2. Confidence Estimation

Referring again to the process illustrated in FIG. 3, for each pair of audio recordings, step 300 yields a set of N possible time offsets (e.g., candidate time offsets) between the recordings, as described above with respect to the matching process shown in FIG. 4. In step 305, a confidence measure is assigned to each candidate time offset estimated for each pairwise match in step 300. The confidence measure assigned to each candidate time offset is a measure of how confident the method is that the particular time offset is the correct one for the pair of signals involved.

In at least one embodiment, this "confidence measure" depends on one or more of the following components (e.g., characteristics) of the correlation function generated for the pair of signals (e.g., the correlation function generated in step 405 of the process shown in FIG. 4): (i) the relative height of the peak corresponding to the candidate time offset as compared to the other peaks corresponding to the other candidate time offsets (e.g., the ratio of the height of the peak to the height of the maximum peak); (ii) the absolute height of the peak corresponding to the candidate time offset (e.g., where the absolute height of the peak is taken directly from the normalized cross-correlation measurement); (iii) the sharpness of the peak corresponding to the candidate time offset (e.g., where sharpness may be measured by the average slope at the peak); and (iv) the overall variance of the N peaks corresponding to the N candidate offsets.

It should be understood that the confidence measure described above is only one example of a confidence measure that may be utilized in accordance with the methods of the present disclosure. Numerous other confidence measures may also be used in addition to or instead of the confidence measure described above. For example, the confidence measure may be based on the height of the peaks corresponding to the candidate time offsets, and/or or the width of the peaks.

Additionally, in at least one embodiment, the confidence measure may be a weighted combination of components (i)-(iv) described above. For example, the confidence measure may be a combination of components (i)-(iv) with weighting terms of 0.5, 0.3, 0.1, and 0.1 respectively. In another embodiment, different weighting terms may be assigned to the components of the confidence measure, or one or more of the components may have a weighting term assigned while the remaining components do not.

1.3. Combining the Information

Once a confidence measure has been assigned to each of the candidate time offsets, for each pairwise match, in step 305, the process illustrated in FIG. 3 moves to step 310 where the candidate time offsets of all the matched pairs of recordings are combined to estimate final time offsets of each audio signal relative to, for example, a reference timeline.

In at least one embodiment of the disclosure, the method uses an algorithm formulated upon a Belief Propagation (BP) framework for combining the pairwise match information described above. The following sections describe the details of this algorithm, including the algorithm's basis in Belief Propagation. In the following, reference is made to FIGS. 5-10, which illustrate various features of the algorithm described below.

As will be described in greater detail below, the net result of implementing the algorithm is the creation of a distribution of "belief" at each node defining the belief in various time offsets between the pair of recordings involved. The time offset at each node having the greatest belief is selected as the best (e.g., most accurate) time offset between the pair of recordings.

2. Graphical Representation of the Multi-Sequence Synchronization Problem

Figure 2:
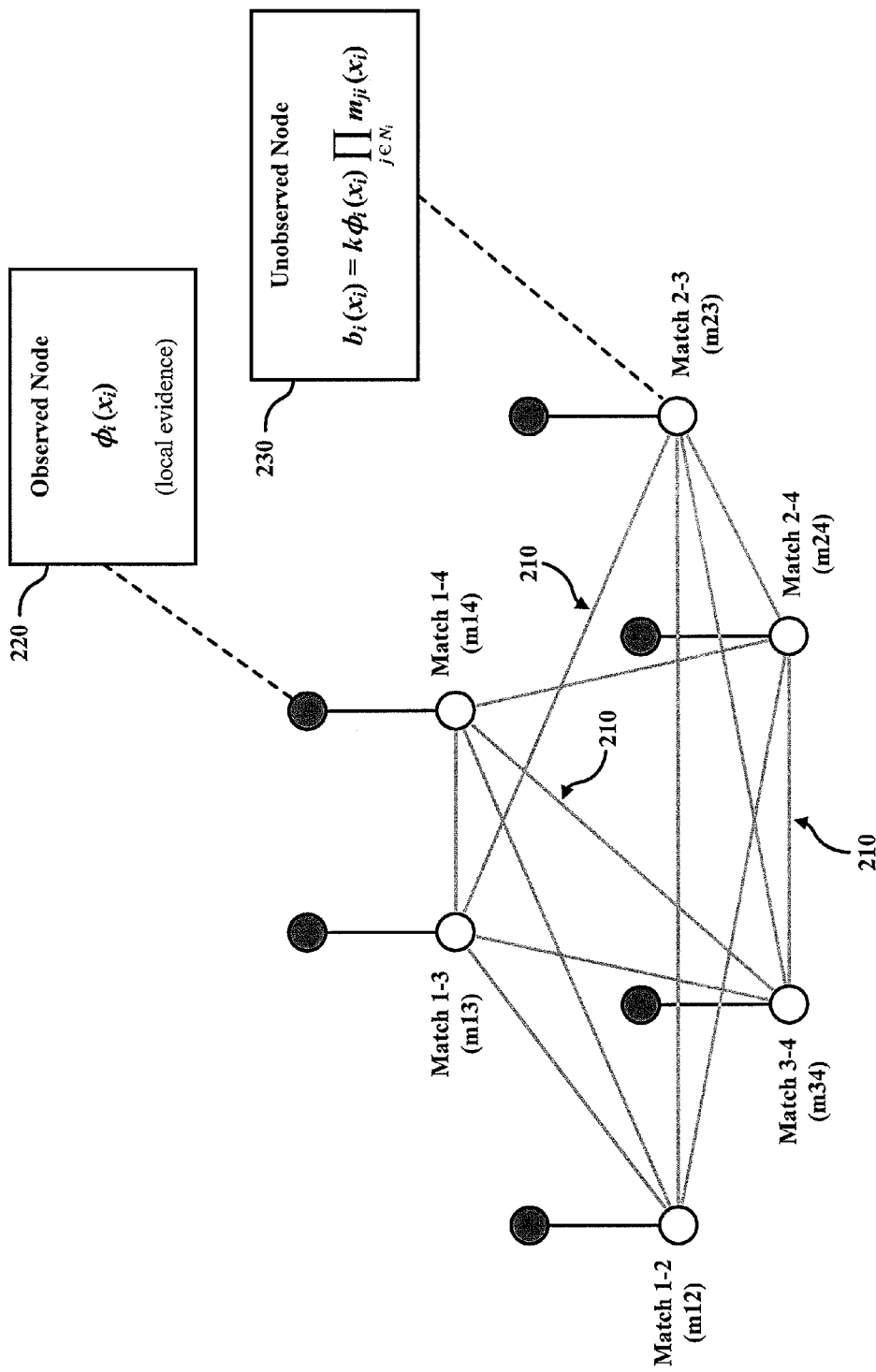
FIG. 2 is a graphical representation of the multi-sequence synchronization problem shown in FIG. 1, in which nodes represent matches between video sequences and edges represent dependencies between matches according to one or more embodiments described herein.

The multi-sequence synchronization problem illustrated in FIG. 1 can be formulated using a graphical representation such as that illustrated in FIG. 2, where each vertex (referred to herein as a "node") represents a random variable. In the graphical formulation of the multi-sequence synchronization problem, each node (identified in FIG. 2 as m12, m13, m14, m23, m24, and m34) represents the match between two of the video recordings 101-104. For example, referring to FIGS. 1 and 2, node m24 represents the match between video recording 102 and video recording 104. Additionally, the random variable that each node (e.g., each of nodes m12, m13, m14, m23, m24, and m34) represents is the time offset of each pairwise match. For example, node m24 represents the time offset between video recording 102 and video recording 104.

In the graphical representation of the multi-sequence synchronization problem shown in FIG. 2, an edge 210 between two nodes (two of nodes m12, m13, m14, m23, m24, and m34) indicates that there is a dependency between the corresponding two matches. In at least the example formulation illustrated, two matches are considered to be dependent if they have one video recording (e.g., one of video recordings 101-104 shown in FIG. 1) in common. For example, "Match 1-3" (which represents the match between video recording 101 and video recording 103, and is identified as node m13 in FIG. 2) is connected by an edge 210 to "Match 2-3" (which represents the match between video recording 102 and video recording 103, and is identified as node m23 in FIG. 2) because they share common video recording 103.

In FIG. 2, the terms "observed" and "unobserved" are used only to distinguish between the nodes containing probability distributions that exist a priori (and so do not change) and the nodes representing the probability distribution or "Belief" that is to be estimated. Hence an "observed node" 220 corresponding to Match 1-4, refers to the "local evidence" node corresponding to Match 1-4, which yields the probability distribution derived from selecting the 5 candidate time offsets from the correlation between the spectrograms for the signals corresponding to video recordings 101 and 104. The "unobserved node" 230 corresponding to Match 1-4 would be the belief calculated at Match 1-4 using the various "message" probabilities from the other connected nodes as well as the "local evidence" or "observed node".

3. Reformulation of Belief Propagation

Belief Propagation (BP) is a powerful message-passing algorithm for performing inference on graphical models (e.g., the graphical representation of the multi-sequence synchronization problem shown in FIG. 2). Belief Propagation can be used to calculate the marginal distribution for each unobserved node 230, conditioned on any observed nodes 220. The following sections present a reformulation of the Belief Propagation framework to fit into the multi-sequence synchronization problem described above.

3.1. Modeling the Offset Random Variable

Figure 5:
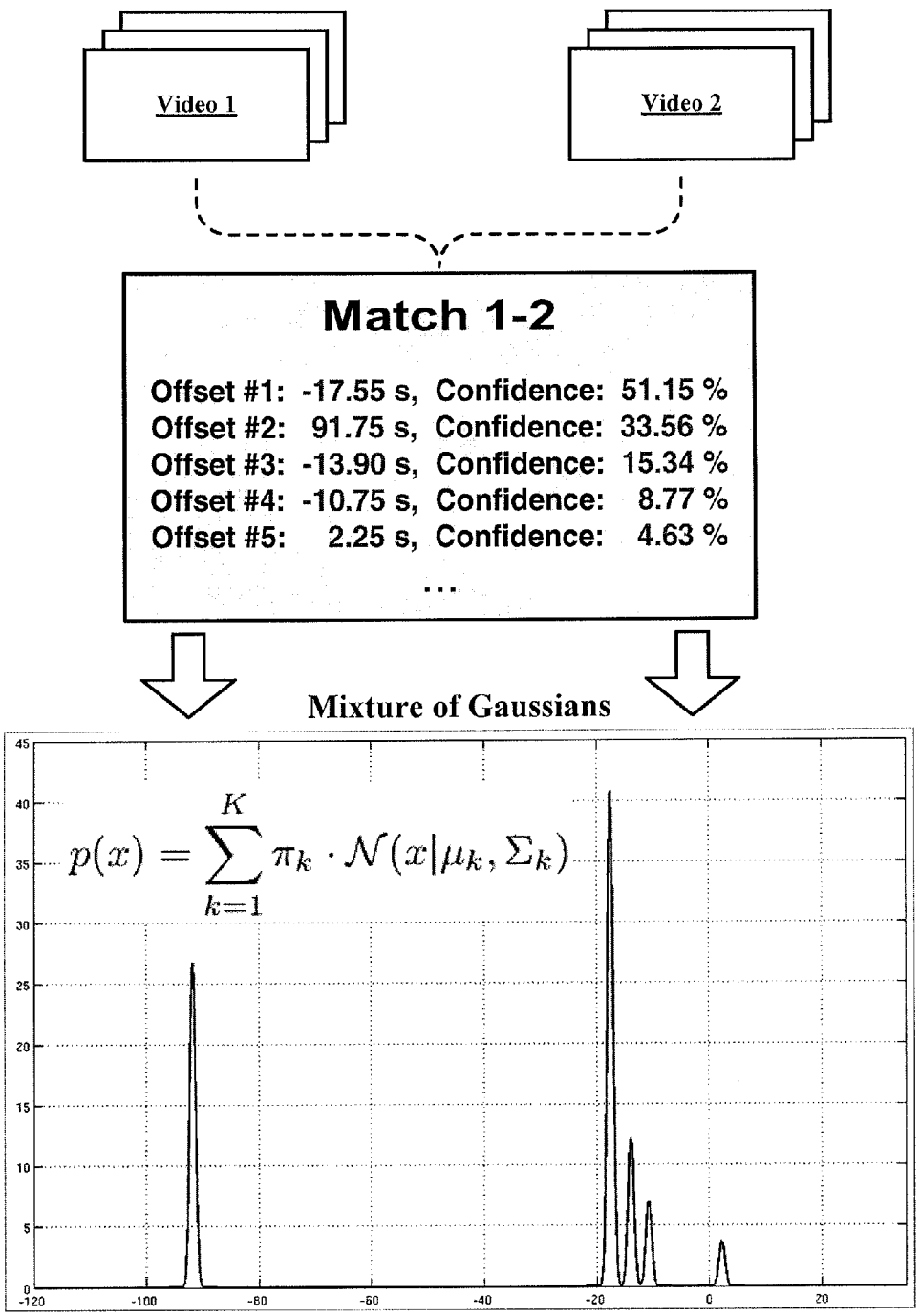
FIG. 5 illustrates an example of modeling the offset random variable as a mixture of Gaussians as part of a reformulation of a Belief Propagation algorithm according to one or more embodiments described herein.

As described above with respect to the processes illustrated in FIGS. 3 and 4, a set of candidate time offsets is generated for each pairwise match of audio recordings. Additionally, each candidate time offset is assigned confidence measure which, in at least some embodiments, may range from 0 to 100. The information for each pairwise match can be modeled as a random variable whose distribution is a mixture of Gaussians:

$$p(x) = \sum_{k=1}^{K} \pi_k \cdot N(x \mid \mu_k, \sigma_k^2)$$

where $\mu_k$, $\sigma_k^2$, $\pi_k$ are the mean, variance, and weight of the k-th Gaussian component, respectively. K is the number of Gaussian components in the mixture, which in at least one implementation is set to 5. An example of modeling the pairwise match information as a mixture of Gaussians is illustrated in FIG. 5.

3.2. Local Evidence

Referring to the graphical formulation illustrated in FIG. 2, the local evidence $\phi_i(x_i)$ is the observed node 220. For each node i, it is assumed the pairwise synchronization algorithm described above with respect to FIGS. 3 and 4 generates a set of time offsets for the corresponding match:

off($t_1$, $c_1$), off($t_2$, $c_2$), off($t_3$, $c_3$), . . .

where $c_k$ are the confidence values of the k-th offset, and the offsets are sorted such that $c_1 > c_2 > c_3 > c_4 > $ . . . and so on. In the BP reformulation of the present disclosure, the local evidence of node i, $\phi_i(x_i)$, takes the value of a mixture of Gaussians with K=5 components as follows:

$$\phi_i(x_i) = \sum_{k=1}^{5} \pi_k \cdot N(x \mid t_k, \sigma^2) \quad (1)$$

where $t_k$ is the timestamp of the offset with the k-th highest confidence measure, $\sigma_k^2$ takes a fixed constant (e.g., 0.5), and $\pi_k$ is the weight of the k-th Gaussian component. Furthermore, $\pi_k$ is set to be the normalized confidence value:

$$\pi_k = \frac{c_k}{\sum_{k=1}^{5} c_k}, (k = 1, 2, 3, 4, 5) \quad (2)$$

3.3. Integrate Opinions with Linear Opinion Pool

Figure 6A:
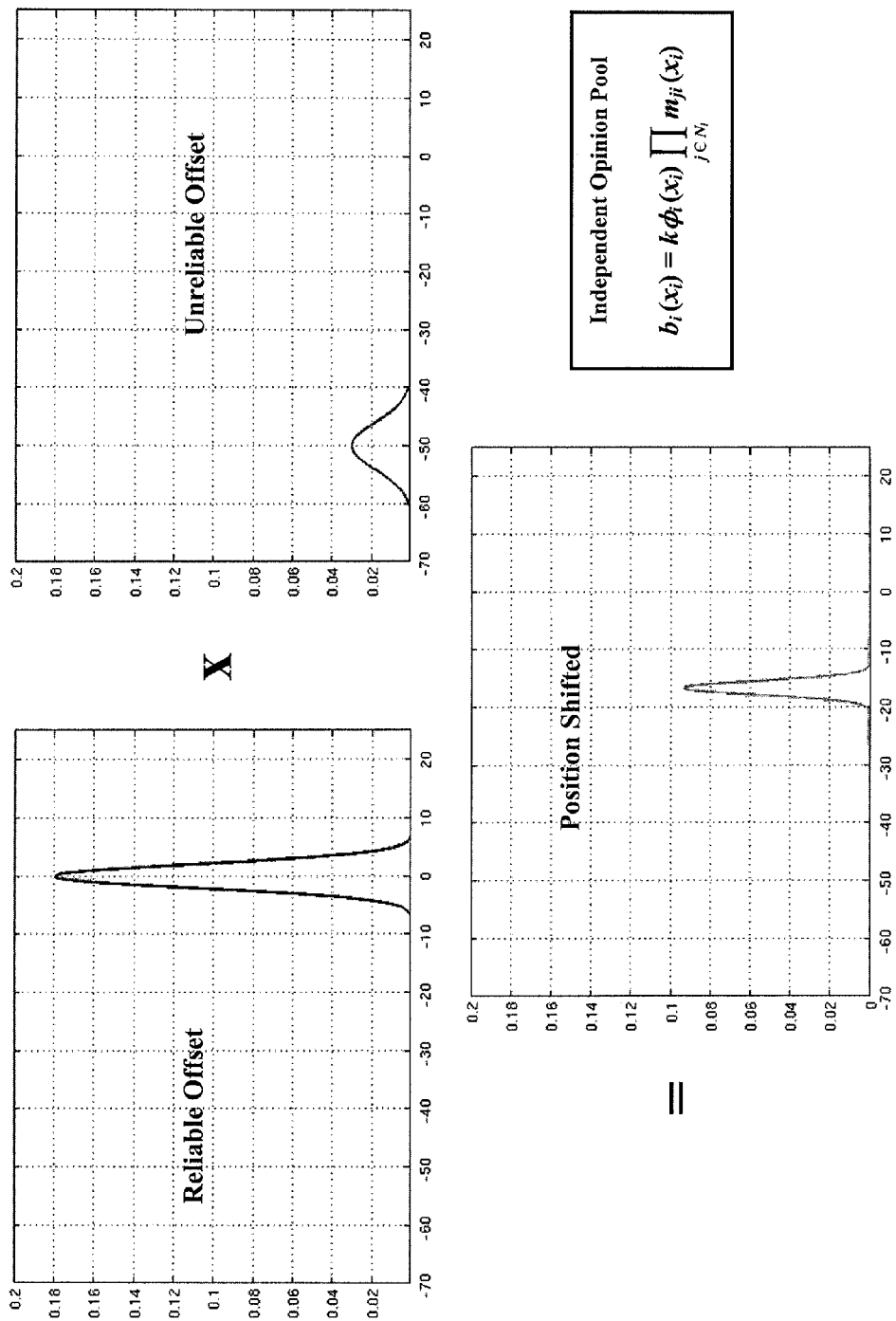
FIG. 6A is a collection of graphical representations illustrating an example scheme for integrating individual opinions as part of the reformulation of a Belief Propagation algorithm according to one or more embodiments described herein.

In the original BP formulation, beliefs and messages are computed using the Independent Opinion Pool scheme, an example of which is illustrated in FIG. 6A. Under the Independent Opinion Pool scheme, the collective opinion equals the product of individual opinions:

$$m_{ij}(x_j) = \sum_{x_i} \varphi_{ij}(x_i, x_j) \phi_i(x_i) \prod_{k \in N_{i/j}} m_{ki}(x_i) \quad (3)$$

$$b_i(x_i) = \phi_i(x_i) \prod_{j \in N_i} m_{ji}(x_i) \quad (4)$$

However, the above formulation in equations (3) and (4) may not be suitable for the problem formulation of the present disclosure. For example, take the scenario illustrated in FIG. 6A, where there are two offset opinions to be integrated, one of which is reliable and the other of which is unreliable. The product of the two distributions shown generates a result in which the peak is not only lowered, but is also horizontally shifted. Accordingly, as described in greater detail below, the method of the present disclosure is designed to prevent this from occurring, since a horizontal shift indicates a change in the final time offset.

Figure 6B:
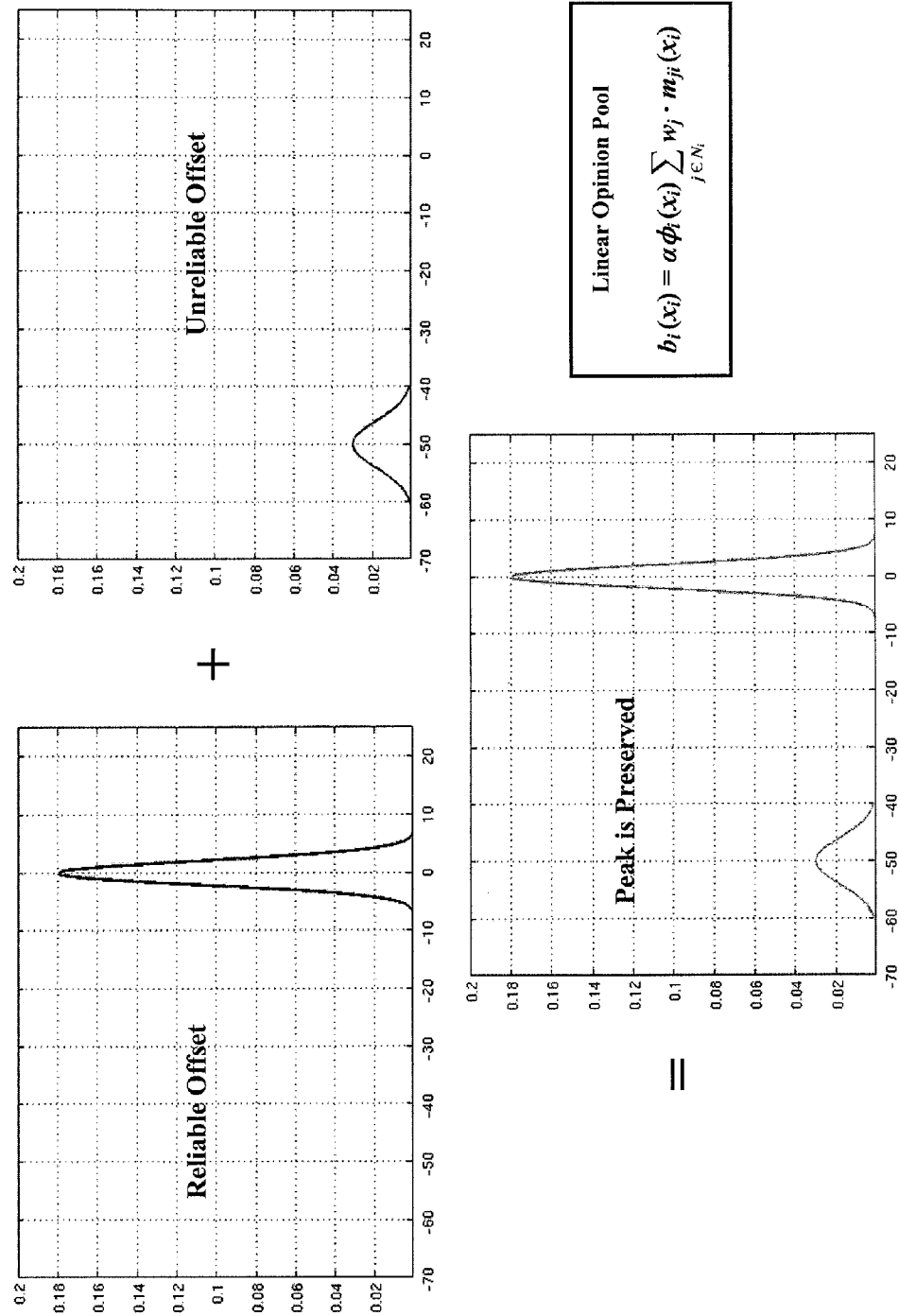
FIG. 6B is a collection of graphical representations illustrating another example scheme for integrating individual opinions as part of the reformulation of a Belief Propagation algorithm according to one or more embodiments described herein.

Referring to the graphical representations illustrated in FIG. 6B, the method described herein adopts the Linear Opinion Pool scheme (rather than the Independent Opinion Pool scheme described above and illustrated in FIG. 6A) to preserve the resulting peak when one of the offset opinions is reliable and the other is unreliable. In the Linear Opinion Pool scheme, the collective opinion is computed using the sum of the individual opinions:

$$b_i(x_i) = \alpha_i \cdot \phi_i(x_i) + \sum_{j \in N_i} w_j \cdot m_{ji}(x_i) \quad (5)$$

where $\alpha_i$ is a parameter that balances the weight between local evidence of incoming information from neighbor messages. In at least one implementation, $\alpha_i$ is computed as the following:

$$\alpha_i = \frac{\pi_1}{0.350} \quad (6)$$

where $\pi_1 = \max\{\pi_k\}$ is the highest weight of the Gaussian components (e.g., as provided by equation (2) above).

3.4. Message Computation

According to the BP formulation of the present disclosure, the message from node i to node j is calculated using the following equation:

$$m_{ij}(x_j) = b_p(x_p) \oplus \left( \alpha_i \cdot \phi_i(x_i) + \sum_{k \in N_{i/j}} w_k \cdot m_{ki}(x_i) \right) \quad (7)$$

where the parameter $\alpha_i$ can be computed as in equation (6) presented above, $N_i$ is the set of nodes that are connected to node i, and node q is the common neighbor of node i and node j.

The message computation according to one or more embodiments of the method described herein comprises two steps. The first step is updating the information at node i using the local evidence of node i and the incoming message from all of the neighbors of node i except node j. The result is a mixture of Gaussians. The second step includes looking for a third node p, which is the only node in the graphical representation that is connected to both node i and node j. For example, if node i represents the match between video "x" and video "y", and node j represents the match between video "x" and video "z", then node p would be the node that represents the match between video "y" and video "z".

Furthermore, in equation (7) presented above, the sign $\oplus$ represents that the reformulation described herein is computing the distribution for the sum of two Gaussian mixtures. Consider the following two Gaussian mixtures:

$$p(m_1) = \sum_k \pi_{1k} \cdot N(m_1 \mid u_{1k}, \sigma_{1k}^2)$$

$$p(m_2) = \sum_k \pi_{2k} \cdot N(m_2 \mid u_{2k}, \sigma_{2k}^2)$$

The above two Gaussian mixtures gives the following:

$$p(m_1) \oplus p(m_2) = \sum_k \sum_j \pi_{1j} \pi_{2k} \cdot N(m \mid u_{1k} + \mu_{2k}, \sigma_{1k}^2 + \sigma_{2k}^2)$$

Therefore, the final message from node i to node j is a combination of two Gaussian mixtures using the $\oplus$ operator, as follows:

$b_p(x_p)$ is the belief at node q; and $$\alpha_i \cdot \phi_i(x_i) + \sum_{k \in N_{i/j}} w_k \cdot m_{ki}(x_i)$$

is the updated information about node i

Figure 7:
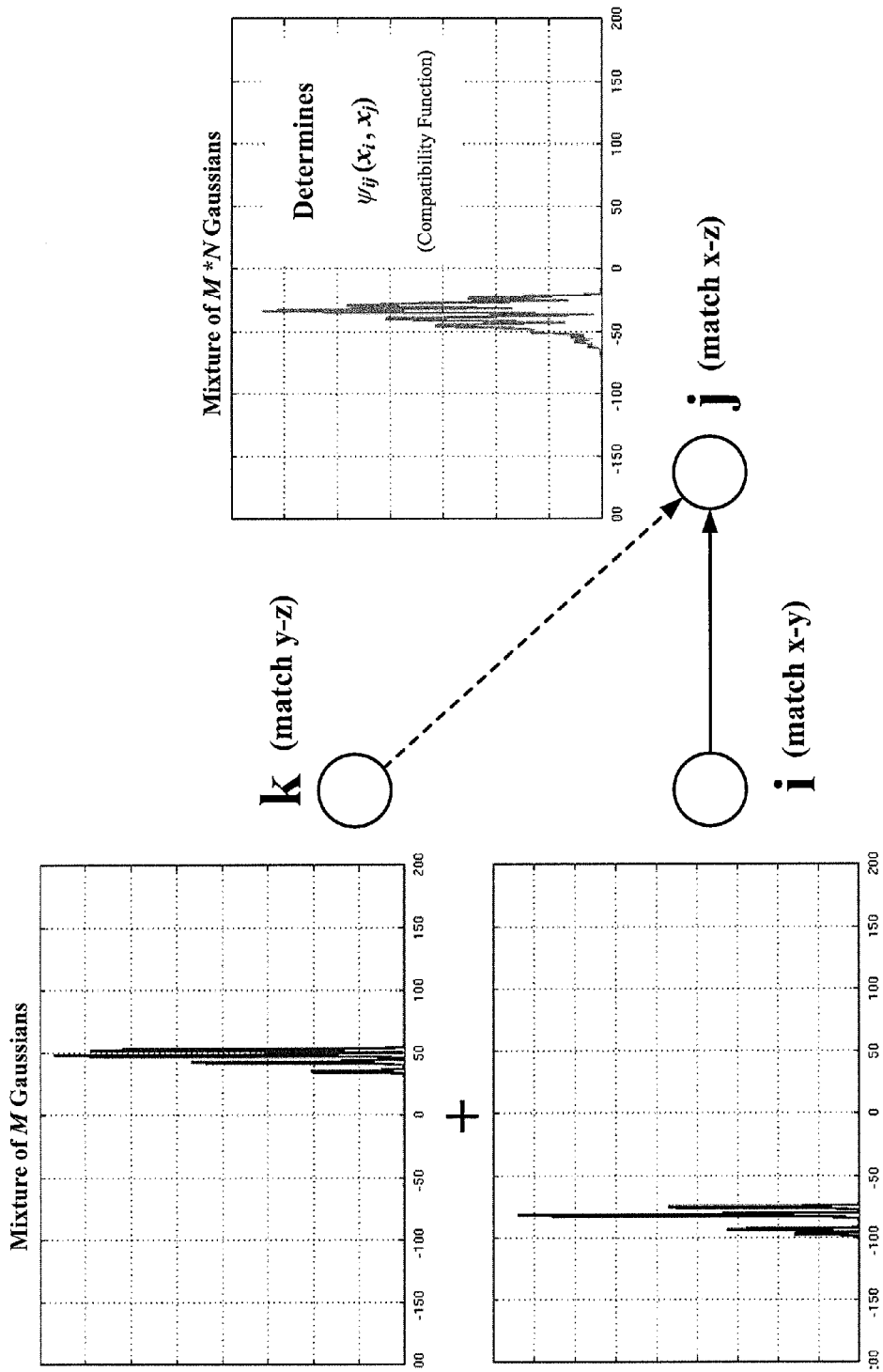
FIG. 7 illustrates an example of computing a message as part of a belief propagation algorithm according to one or more embodiments described herein.

An example of using the $\oplus$ operator to integrate two mixtures of Gaussians is illustrated in FIG. 7.

4. Belief and Message Initialization

Before the iterations of belief propagation begin, it is necessary to initialize the beliefs and messages. The belief at node i is simply initialized as its local evidence:

$$b_i(x_i)_{initial} = \phi_i(x_i)$$

Additionally, the messages are initialized in the following manner:

$$m_{ji}(x_j)_{initial} = \phi_k(x_k) \oplus \phi_i(x_i) \quad (8)$$

where node k is the common neighbor of node i and node j.

5. Updating the Beliefs and Messages

Figure 8:
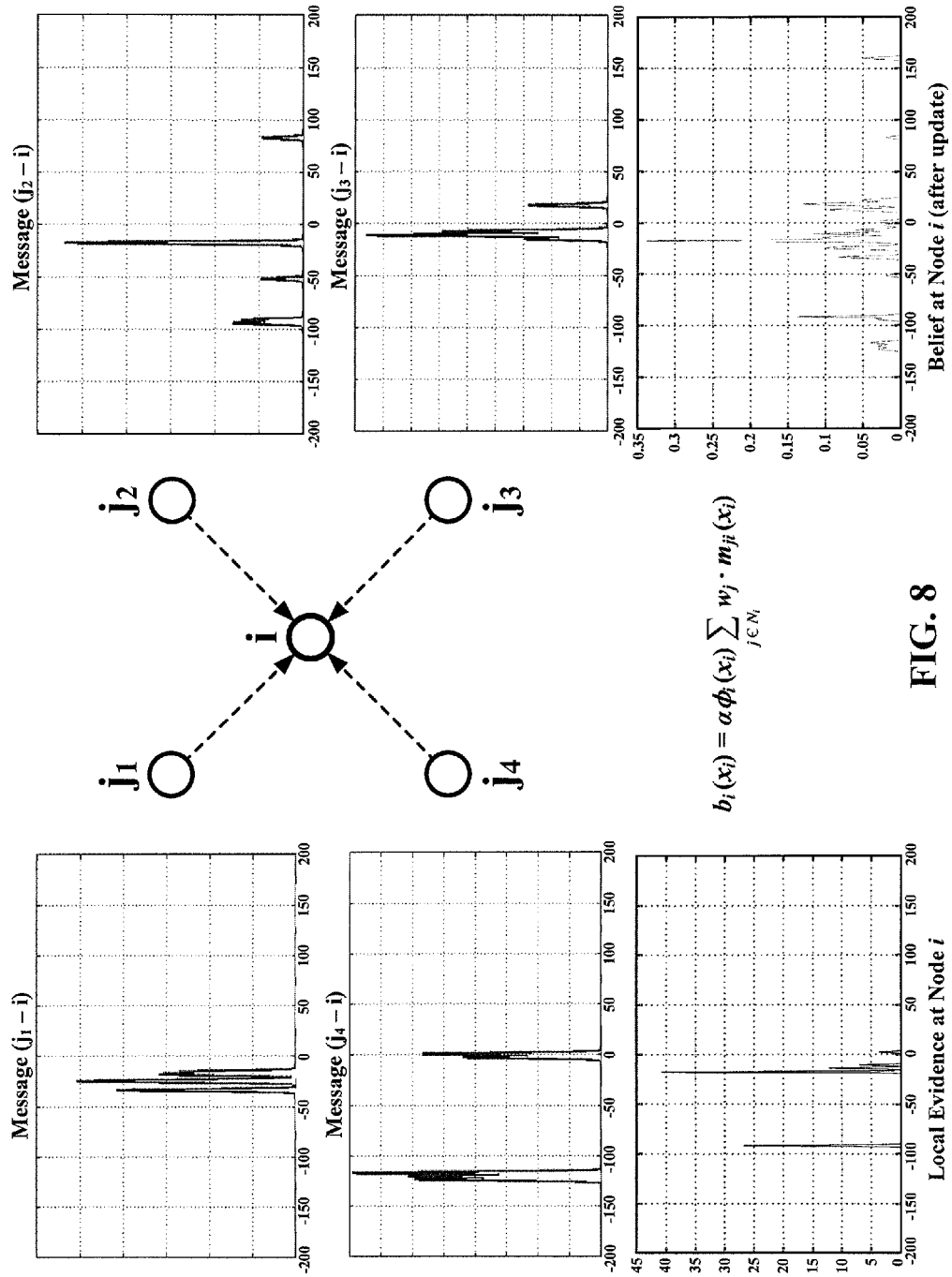
FIG. 8 illustrates an example process for updating a belief at a node in the graphical representation shown in FIG. 2.

At each iteration of the algorithm presented herein, both the belief and messages will be updated. In at least one embodiment, the belief is updated using equation (5). FIG. 8 illustrates the overall process of updating the belief at node i. With reference to FIG. 5, the updated belief at node i is a weighted sum of (1) the local evidence $\phi_i(x_i)$ (with weight $\alpha_i$); and (2) messages $m_{ji}(x_i)$ that come in from all of the neighbors of node j.

Figure 9:
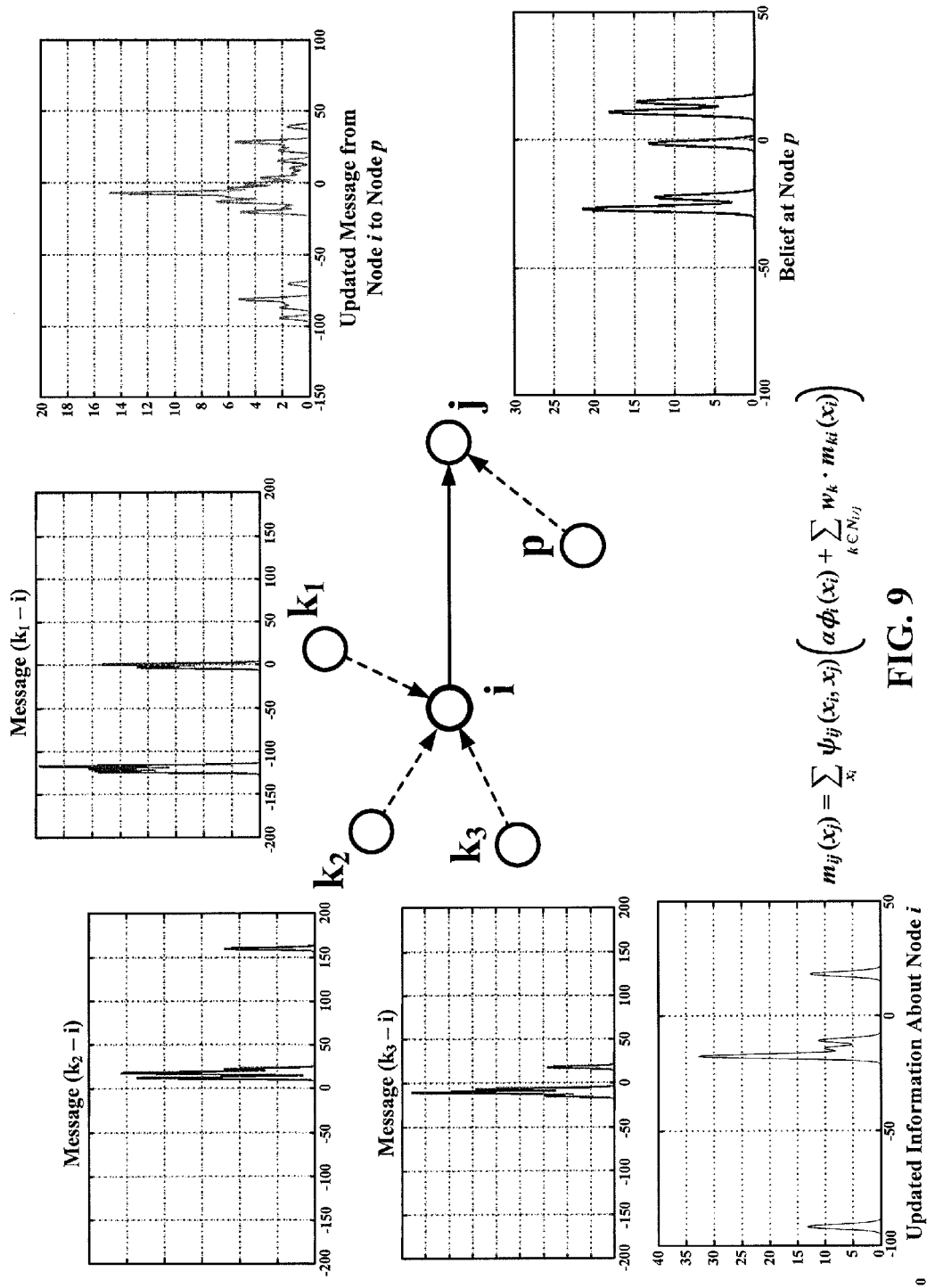
FIG. 9 illustrates an example process for updating a message between neighboring nodes in the graphical representation shown in FIG. 2.

According to one or more embodiments, the message update process (e.g., as provided in equation (7)) comprises two separate stages. FIG. 9 illustrates the overall process of updating the message from node i to node j. At the first stage, in order to update the message from node i to node j, the information about node i must first be updated using its local evidence $\phi_i(x_i)$, as well as messages that come from all of the neighbors of node i excluding node j. The second stage identifies node k, which is the common neighbor of both node i and node j. With the belief at node p, $b_p(x_p)$, as well as the updated information about node i, the sum of two mixtures of Gaussians is used to obtain the final updated message.

6. Gaussian Mixture: Component Pruning

Figure 10:
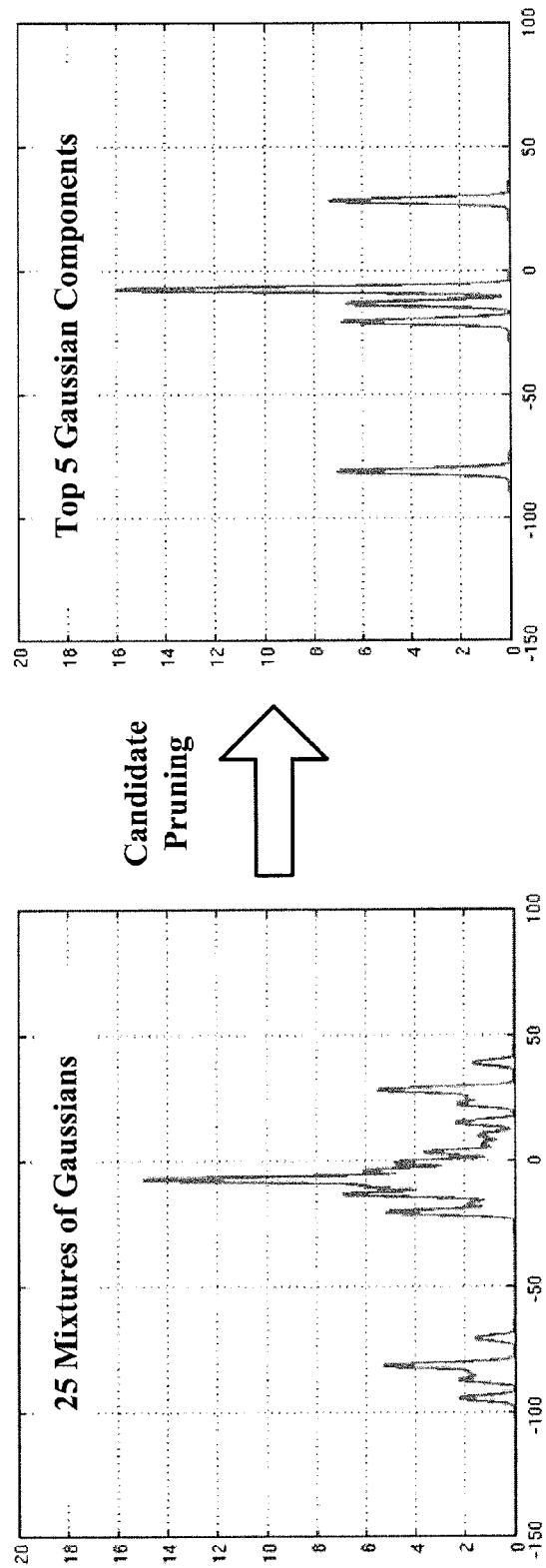
FIG. 10 illustrates an example process for pruning components in a Gaussian mixture according to one or more embodiments described herein.

During the updating processes described above, and illustrated in FIGS. 8 and 9, the size of the Gaussian mixture continues to grow. Because such growth can potentially lead to memory problems, the method described herein may be designed to perform component pruning by keeping only a fixed number of Gaussian mixtures. For example, suppose a probability distribution (Z) having many local modes, which will be the case when calculating the beliefs and the various messages. Then, if the number of Gaussian mixtures is fixed at 5, the method described herein detects the 5 highest peaks from the given probability distribution Z, and uses these peaks as the mean values of the 5 final mixtures. The method then renormalizes the weight of these 5 Gaussian components, $\pi_k$, to ensure the sum of their weights equals 1.0. The variance of each Gaussian component is then set as the following:

$$\sigma_k^2 = \frac{\beta}{\pi_k} \quad (9)$$

where $\pi_k$ is the weight of the k-th Gaussian component, and $\beta$ is a constant parameter (e.g., equal to 0.78). An example of the component pruning process is illustrated in FIG. 10.

7. The Final Algorithm

In accordance with one or more embodiments described herein, the overall process of the algorithm formulated herein is as follows:

(i) Calculate the Local Evidence (e.g., the probability distribution message originating from the "observed node") using equation (1);

(ii) Calculate the messages in each edge of the graph using equation (8);

(iii) Update the beliefs using equation (5); and (iv) Update messages by combining probabilities at each node using equation (7).

An alternative embodiment may include the use of multi-way direct matching. For example, the best match from among all of the exhaustive pairwise matching correlation functions may be selected. However, such an approach would involve an increase in required compute power.

Figure 11:
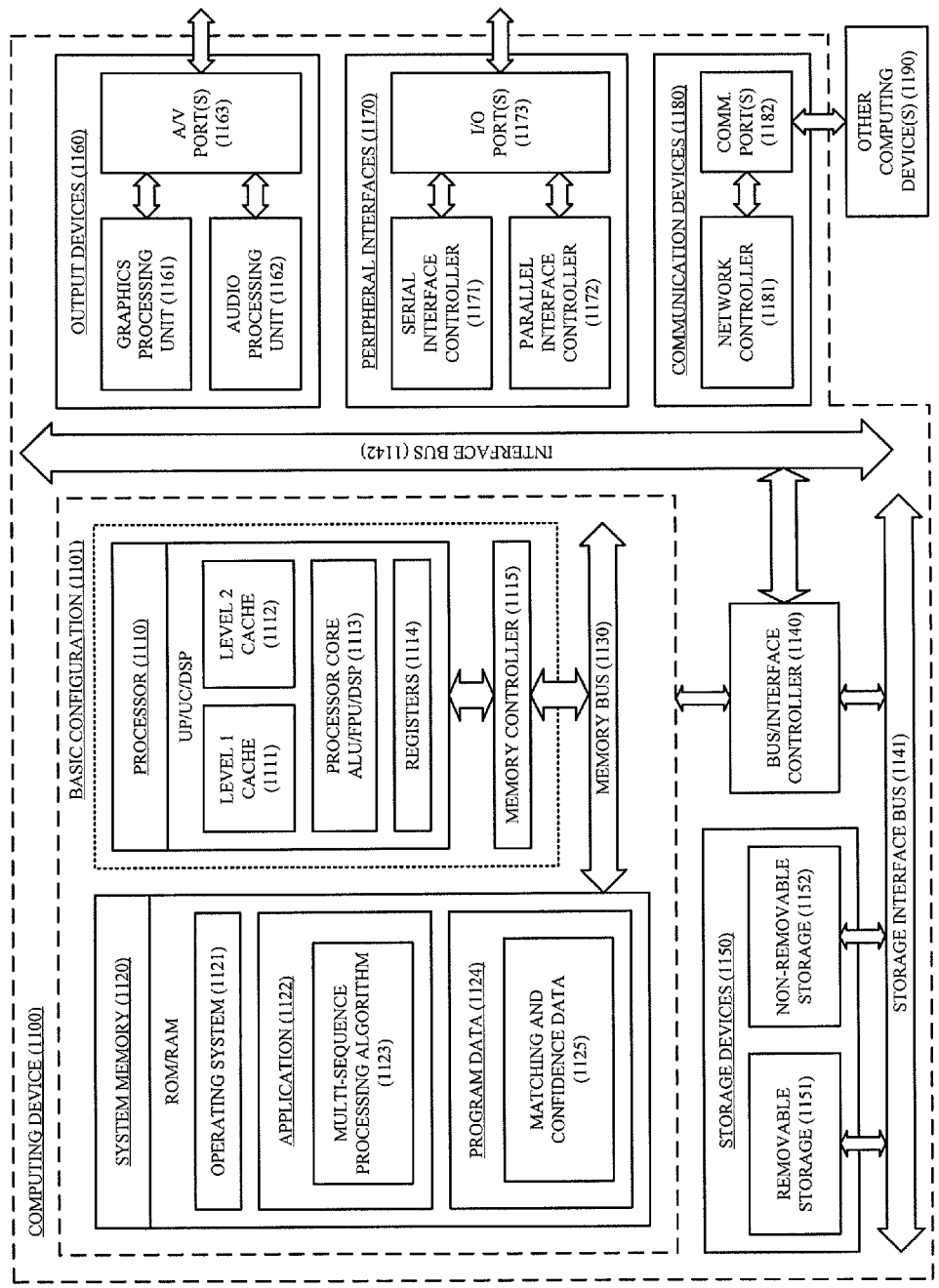
FIG. 11 is a block diagram illustrating an example computing device arranged for synchronizing multiple video recordings according to one or more embodiments described herein.

FIG. 11 is a block diagram illustrating an example computing device 1100 that is arranged for forming pairwise matches of audio signals of multiple video recordings, extracting a set of candidate time offsets between each pair of recordings based on features of the corresponding audio pair, assigning a confidence measure to each candidate time offset based on a level of confidence that the particular candidate time offset is correct for the pair of recordings, and combining all candidate time offsets (with confidence measures assigned) to obtain the most accurate time offset between each pair of recordings in accordance with one or more embodiments of the present disclosure. In a very basic configuration 1101, computing device 1100 typically includes one or more processors 1110 and system memory 1120. A memory bus 1130 may be used for communicating between the processor 1110 and the system memory 1120.

Depending on the desired configuration, processor 1110 can be of any type including but not limited to a microprocessor (µP), a microcontroller (µC), a digital signal processor (DSP), or any combination thereof. Processor 1110 may include one or more levels of caching, such as a level one cache 1111 and a level two cache 1112, a processor core 1113, and registers 1114. The processor core 1113 may include an arithmetic logic unit (ALU), a floating point unit (FPU), a digital signal processing core (DSP Core), or any combination thereof. A memory controller 1115 can also be used with the processor 1110, or in some embodiments the memory controller 1115 can be an internal part of the processor 1110.

Depending on the desired configuration, the system memory 1120 can be of any type including but not limited to volatile memory (e.g., RAM), non-volatile memory (e.g., ROM, flash memory, etc.) or any combination thereof. System memory 1120 typically includes an operating system 1121, one or more applications 1122, and program data 1124. In at least some embodiments, application 1122 includes a multi-sequence processing algorithm 1123 that is configured to match pairs of audio signals of multiple video recordings, and combine all possible time offsets between each pair of recordings to obtain the most likely actual time offset between each pair of recordings. The multi-sequence processing algorithm 1123 is further arranged to generate a set of possible time offsets between each pair of recordings based on features of the corresponding audio signal pair, and assign a confidence measure to each possible time offset based on a level of confidence that the particular time offset is accurate for the pair of recordings.

Program Data 1124 may include matching and confidence data 1125 that is useful for generating a set of candidate time offsets for each pair of recordings, and assigning a confidence measure to each candidate time offset based on various features of the corresponding pair of audio signals. In some embodiments, application 1122 can be arranged to operate with program data 1124 on an operating system 1121 such that all candidate time offsets, each with an assigned confidence measure, may be combined using the multi-sequence processing algorithm 1123 to obtain the most accurate actual time offset between each pair of recordings.

Computing device 1100 can have additional features and/or functionality, and additional interfaces to facilitate communications between the basic configuration 1101 and any required devices and interfaces. For example, a bus/interface controller 1140 can be used to facilitate communications between the basic configuration 1101 and one or more data storage devices 1150 via a storage interface bus 1141. The data storage devices 1150 can be removable storage devices 1151, non-removable storage devices 1152, or any combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), tape drives and the like. Example computer storage media can include volatile and nonvolatile, removable and non-removable media implemented in any method or technology for storage of information, such as computer readable instructions, data structures, program modules, and/or other data.

System memory 1120, removable storage 1151 and non-removable storage 1152 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media can be part of computing device 1100.

Computing device 1100 can also include an interface bus 1142 for facilitating communication from various interface devices (e.g., output interfaces, peripheral interfaces, communication interfaces, etc.) to the basic configuration 1101 via the bus/interface controller 1140. Example output devices 1160 include a graphics processing unit 1161 and an audio processing unit 1162, either or both of which can be configured to communicate to various external devices such as a display or speakers via one or more A/V ports 1163. Example peripheral interfaces 1170 include a serial interface controller 1171 or a parallel interface controller 1172, which can be configured to communicate with external devices such as input devices (e.g., keyboard, mouse, pen, voice input device, touch input device, etc.) or other peripheral devices (e.g., printer, scanner, etc.) via one or more I/O ports 1173.

An example communication device 1180 includes a network controller 1181, which can be arranged to facilitate communications with one or more other computing devices 1190 over a network communication (not shown) via one or more communication ports 1182. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 1100 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1100 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those skilled within the art that each function and/or operation within such block diagrams, flowcharts, or examples can be implemented, individually and/or collectively, by a wide range of hardware, software, firmware, or virtually any combination thereof.

In one or more embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments described herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Those skilled in the art will further recognize that designing the circuitry and/or writing the code for the software and/or firmware would be well within the skill of one of skilled in the art in light of the present disclosure.

Additionally, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link, etc.).

Those skilled in the art will also recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for synchronizing audio signals, the method comprising:
   matching pairs of audio signals to estimate candidate time offsets between corresponding pairs of video recordings;
   assigning a confidence measure to each of the candidate time offsets of each pair of video recordings based on features of the corresponding pair of audio signals;
   creating probability distributions based on the candidate time offsets; and
   estimating final time offsets for each of the corresponding video recordings relative to any reference timeline using an iterative technique based on a graphical representation of the pairs of video recordings, wherein the iterative technique combines the probability distributions into a final probability distribution over all candidate time offsets, and wherein the graphical representation includes nodes each representing a pairwise match of audio signals.

2. The method of claim 1, wherein matching the pairs of audio signals includes generating a correlation function between signal pairs in the time-domain.

3. The method of claim 1, wherein matching the pairs of audio signals includes generating a correlation function using phase correlation between the signal pairs.

4. The method of claim 1, wherein matching the pairs of audio signals includes generating a correlation function based on spectrograms of each signal.

5. The method of claim 1, wherein assigning the confidence measure to each of the candidate time offsets of each pair of video recordings includes assigning a confidence measure to a select group of matches between any single pair.

6. The method of claim 5, wherein the confidence measure is generated by combining measurements of slope, absolute height, relative height, and variance of peaks of the select group.

7. The method of claim 6, wherein the combined measurements are linear.

8. The method of claim 1, wherein combining the candidate time offsets of all of all the pairs of audio signals includes:
creating probability distributions based on the candidate time offsets; and
estimating each final time offset using belief propagation.

9. The method of claim 1, wherein the final time offset for a pair of video recordings is estimated as the candidate time offset having maximum probability in the combined probability distribution.

10. The method of claim 1, wherein the nodes in the graphical representation are connected to each other if they have a video recording in common.

11. The method of claim 1, wherein the probability distributions are combined based on an assumption that each probability distribution can be approximated by a mixture of Gaussian distributions.

12. The method of claim 10, wherein the final probability distribution is calculated by propagating probability distributions along edges between each node and combining all of the probability distributions propagated at a given node.

13. A method for synchronizing a plurality of video recordings, the method comprising:
generating candidate time offsets between at least one pair of video recordings;
assigning a confidence measure to each of the candidate time offsets based on audio signals of the at least one pair of video recordings;
creating probability distributions based on the candidate time offsets; and
estimating a final time offset between the at least one pair of video recordings using an iterative technique that combines the probability distributions into a final probability distribution over all candidate time offsets.

14. The method of claim 13, further comprising matching the audio signals of the at least one pair of video recordings to generate the candidate time offsets between the at least one pair of video recordings.

15. The method of claim 14, wherein matching the audio signals of the at least one pair of video recordings includes generating a correlation function between the audio signals in the time-domain.

16. The method of claim 14, wherein matching the audio signals of the at least one pair of video recordings includes generating a correlation function using phase correlation between the audio signals.

17. The method of claim 14, wherein matching the audio signals of the at least one pair of video recordings includes generating a correlation function based on comparing spectrograms of each of the audio signals.

18. The method of claim 13, wherein the confidence measure is assigned based on measurements of at least one of slope, absolute height, relative height, and variance of peaks of a correlation function generated for the audio signals of the at least one pair of video recordings.

19. The method of claim 13, wherein the confidence measure is assigned based on measurements of slope, absolute height, relative height, and variance of peaks of a correlation function generated for the audio signals of the at least one pair of video recordings.

20. The method of claim 13, wherein the iterative technique is based on a graphical representation of the at least one pair of video recordings, and wherein the graphical representation includes nodes each representing a pairwise match of the audio signals of the at least one pair of video recordings.

* * * * *